United States Patent
De'Longhi

(10) Patent No.: US 8,042,454 B2
(45) Date of Patent: Oct. 25, 2011

(54) MACHINE FOR FILTERED COFFEE

(75) Inventor: Giuseppe De'Longhi, Treviso (IT)

(73) Assignee: De' Longhi SpA, Treviso (IT)

( * ) Notice: Subject to any disclaimer, the term of this patent is extended or adjusted under 35 U.S.C. 154(b) by 732 days.

(21) Appl. No.: 12/223,088

(22) PCT Filed: Jan. 15, 2007

(86) PCT No.: PCT/EP2007/050358
§ 371 (c)(1),
(2), (4) Date: Jul. 22, 2008

(87) PCT Pub. No.: WO2007/082869
PCT Pub. Date: Jul. 26, 2007

(65) Prior Publication Data
US 2010/0269704 A1    Oct. 28, 2010

(30) Foreign Application Priority Data
Jan. 23, 2006  (IT) .............................. UD2006A0013

(51) Int. Cl.
*A41J 31/057* (2006.01)
(52) U.S. Cl. ........................................ 99/289 R; 99/300
(58) Field of Classification Search ................ 99/289 R, 99/300–307
See application file for complete search history.

(56) References Cited

U.S. PATENT DOCUMENTS

| | | | |
|---|---|---|---|
| 4,630,532 A * | 12/1986 | Sonnentag et al. | ............. 99/279 |
| D288,885 S | 3/1987 | Kahlcke | |
| 4,704,954 A * | 11/1987 | Mollenhoff | ..................... 99/279 |
| 4,805,523 A | 2/1989 | Stuckey et al. | |
| D310,613 S | 9/1990 | Wu | |
| D316,004 S | 4/1991 | Eugster | |
| D317,996 S | 7/1991 | Jack | |
| D328,217 S | 7/1992 | Beeren | |
| 5,133,247 A * | 7/1992 | Pastrick | .......................... 99/295 |
| 5,219,394 A * | 6/1993 | Simmons | ........................ 99/299 |
| 5,239,914 A | 8/1993 | Salomon et al. | |
| 5,251,541 A * | 10/1993 | Anson et al. | ..................... 99/280 |

(Continued)

FOREIGN PATENT DOCUMENTS

DE       103 35 824       3/2005

(Continued)

OTHER PUBLICATIONS

Co-pending Application entitled Machine for Filtered Coffee With Shutter Opening, filed Jul. 22, 2008.

*Primary Examiner* — Mark Graham
(74) *Attorney, Agent, or Firm* — Hamre, Schumann, Mueller & Larson, P.C.

(57) ABSTRACT

A machine for filtered coffee comprising a main body having at least a tank containing the water, at least an aperture to access at least the containing tank in order to load the water, and at least a basket, comprising a housing compartment to house members to filter the coffee. The basket is pivoted to the main body so as to be rotatably and selectively disposed between a closed position, in which the basket is comprised in the bulk of the main body, in such a manner that access to the housing compartment is prevented, and an open position, in which the basket makes access available to the housing compartment, and vice versa. The basket, in the closed position, closes the aperture, preventing access to the tank.

6 Claims, 3 Drawing Sheets

U.S. PATENT DOCUMENTS

| | | | |
|---|---|---|---|
| D345,883 S | 4/1994 | Maass | |
| 5,301,600 A | 4/1994 | Medema | |
| D350,667 S | 9/1994 | Saltet | |
| D359,195 S | 6/1995 | Mukai et al. | |
| D359,413 S | 6/1995 | Storsberg | |
| 5,485,778 A * | 1/1996 | Ullmann | 99/295 |
| 5,503,060 A * | 4/1996 | Morecroft et al. | 99/295 |
| 5,586,485 A | 12/1996 | Baumann | |
| 5,687,637 A * | 11/1997 | Brookshire et al. | 99/295 |
| 5,957,036 A * | 9/1999 | Warner et al. | 99/299 |
| 5,964,141 A * | 10/1999 | Andrew et al. | 99/280 |
| D418,000 S | 12/1999 | Mork et al. | |
| D421,360 S | 3/2000 | Lin | |
| 6,067,895 A * | 5/2000 | Buist et al. | 99/305 |
| 6,101,924 A * | 8/2000 | Blankenship et al. | 99/299 |
| D437,961 S | 2/2001 | Hsu | |
| D446,990 S | 8/2001 | Prat | |
| 6,272,974 B1 | 8/2001 | Pascotti et al. | |
| D449,196 S | 10/2001 | Bouhuys et al. | |
| D449,197 S | 10/2001 | Byler | |
| 6,298,770 B1 * | 10/2001 | Blankenship et al. | 99/304 |
| D453,656 S | 2/2002 | Byler et al. | |
| 6,357,342 B1 | 3/2002 | Leung | |
| D457,376 S | 5/2002 | Lin | |
| 6,532,862 B2 | 3/2003 | Mork et al. | |
| D473,745 S | 4/2003 | Mulle et al. | |
| 6,571,686 B1 * | 6/2003 | Riley et al. | 99/299 |
| D479,087 S | 9/2003 | Yao | |
| D479,089 S | 9/2003 | Yao | |
| D481,902 S | 11/2003 | O'Connor et al. | |
| D502,628 S | 3/2005 | Ledingham et al. | |
| 6,964,222 B1 * | 11/2005 | Tucker | 99/281 |
| D513,572 S | 1/2006 | Schaffeld et al. | |
| D513,681 S | 1/2006 | Picozza et al. | |
| D514,865 S | 2/2006 | Steiner | |
| 7,013,795 B2 | 3/2006 | Mulle et al. | |
| D524,588 S | 7/2006 | Copland | |
| 7,146,904 B2 * | 12/2006 | Scribner | 99/300 |
| D543,770 S | 6/2007 | Ye | |
| D543,771 S | 6/2007 | Julemont | |
| D545,110 S | 6/2007 | Julemont | |
| D561,515 S | 2/2008 | De Pra' | |
| D561,516 S | 2/2008 | De Pra' | |
| D561,517 S | 2/2008 | Borin et al. | |
| D561,518 S | 2/2008 | Borin et al. | |
| D562,052 S | 2/2008 | De Pra' | |
| 2006/0196365 A1 * | 9/2006 | Garman | 99/306 |
| 2008/0216667 A1 * | 9/2008 | Garman et al. | 99/304 |
| 2010/0203209 A1 * | 8/2010 | Fishbein et al. | 426/433 |
| 2011/0048241 A1 * | 3/2011 | Smit | 99/288 |

FOREIGN PATENT DOCUMENTS

EP  0 079 235  5/1983

* cited by examiner

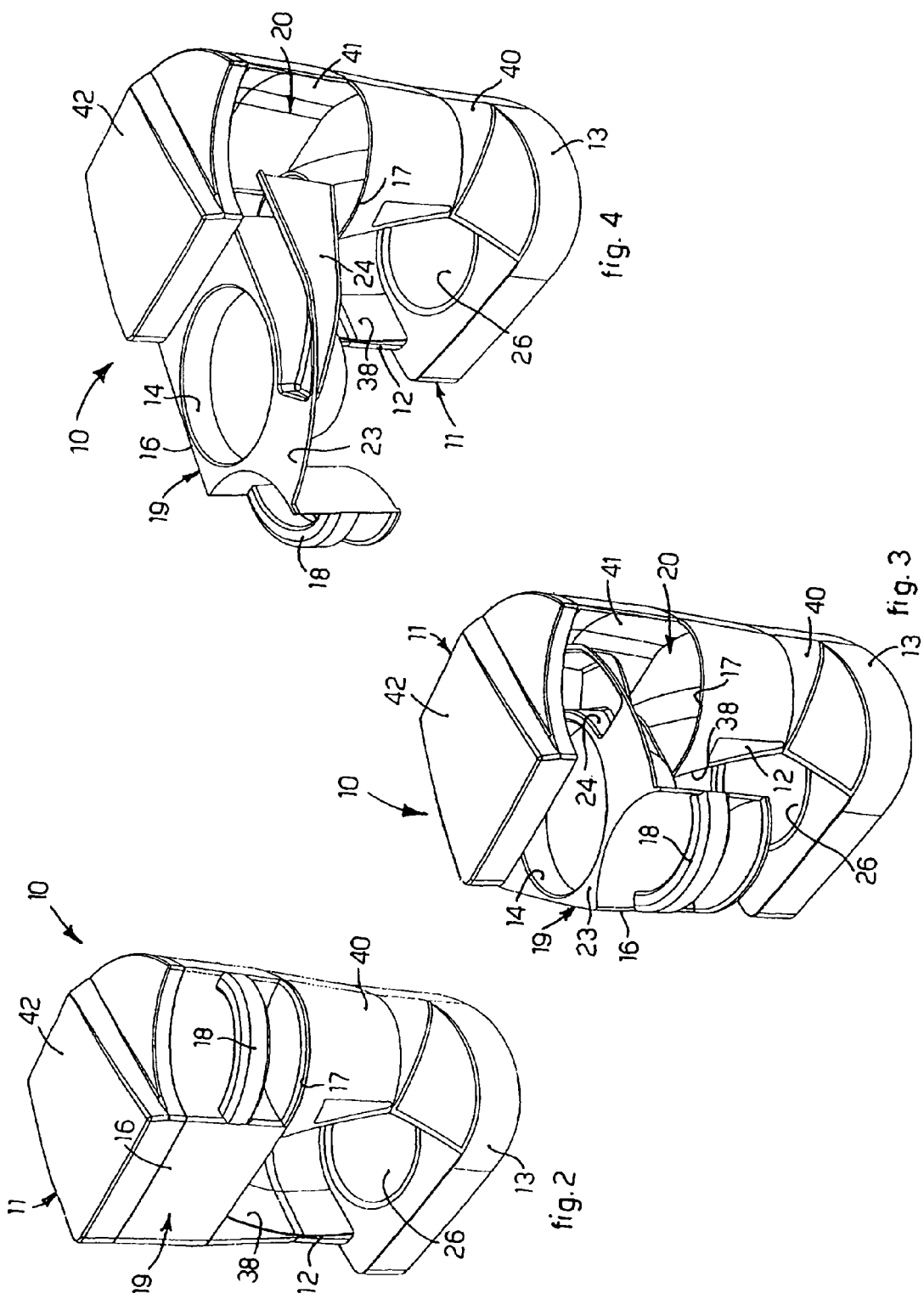

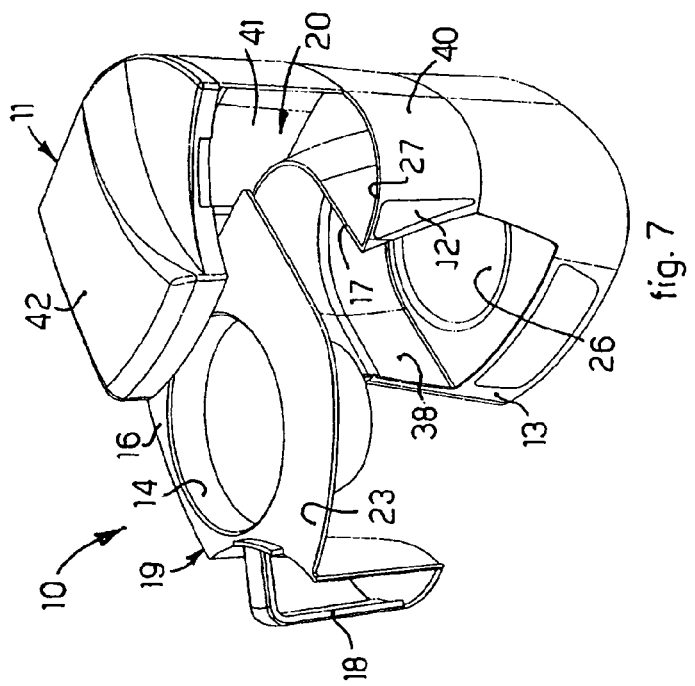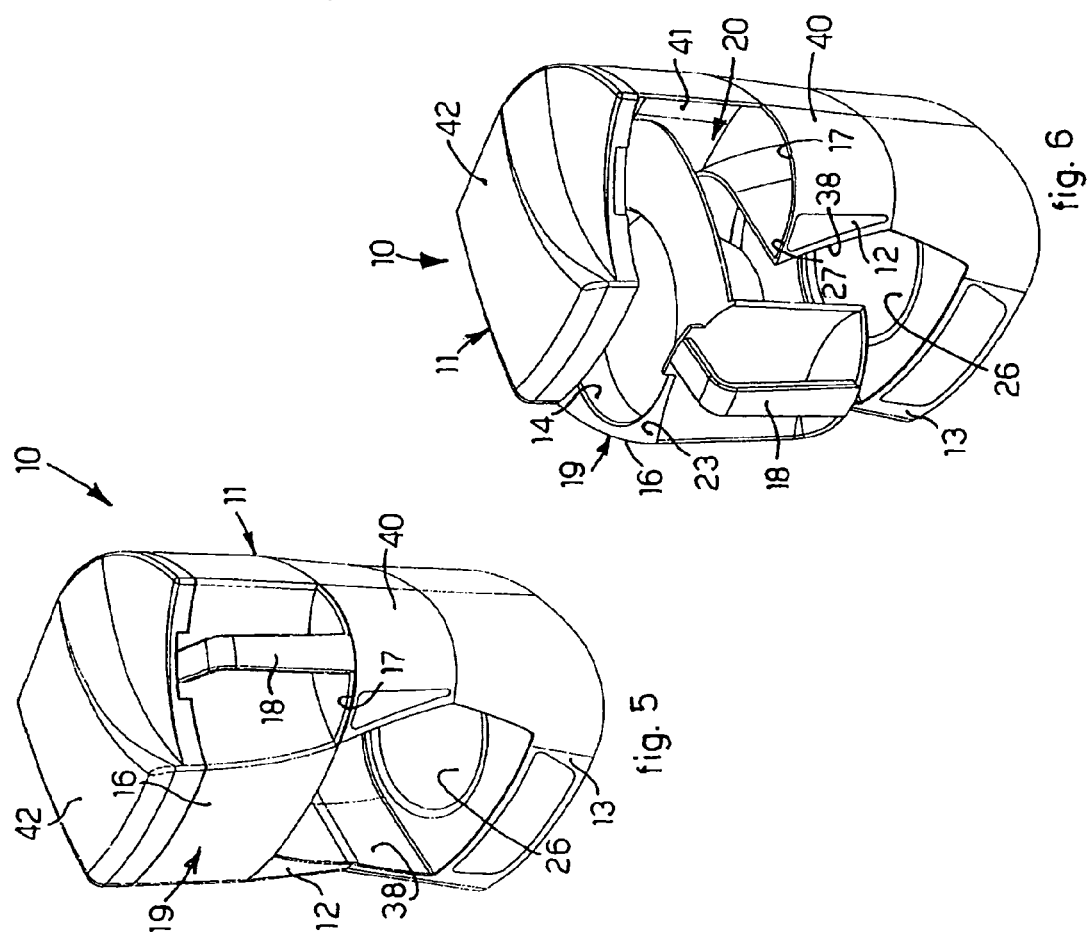

MACHINE FOR FILTERED COFFEE

FIELD OF THE INVENTION

The present invention concerns a machine for filtered coffee, having a completely frontal system for loading the coffee and water, so as to allow direct and frontal access to the filter for the powdered coffee and to the water tank, in order to carry out the usual operations to prepare and reload the machine.

By prepare and reload we mean all those operations necessary to dispose/remove the filter in a relative filter-carrier compartment and/or load it and/or clean it, and also to fill the tank and/or maintain it, or other.

In the following description we shall refer specifically to a machine for preparing filtered coffee, but it is clear that the machine can be effectively used, as moreover is already known, for preparing tisanes, infusions or similar drinks obtained by percolating hot vegetable substances.

BACKGROUND OF THE INVENTION

Machines for preparing filtered coffee, also called "American coffee", are known.

An example of a machine of this type is disclosed in the patent document U.S. Pat. No. 5,687,637.

These known machines substantially have a main body which houses a filter for the powdered coffee, disposed in a relative filter-carrier compartment, and a tank for the water. Such known machines are also provided with at least a lid pivoted to the upper part of the main body, which lid opens by rotating upwards.

The upward opening of the lid allows access only from above, both to the filter-carrier compartment to load, clean and/or replace the filter, and also to the water tank in order to carry out direct loading or removal from above, and/or other similar operations for reloading and preparing the machine.

These known machines have the disadvantage, however, that they allow the above operations to be performed only by intervening from above; for their installation they therefore need, not only the volume of the main body, but also an additional space upwards, both to lift the lid and also for the loading maneuvers by the user; they thus limit their potential use in built-in applications, for example in furniture for domestic kitchens and suchlike.

Alternatively, the user is obliged, every time the machine is reloaded, to displace the machine in order to prevent interference with adjacent furniture or equipment.

Machines for filtered coffee are also known with a main body which has, pivoted to it, both a door opening frontally with the filter-carrier compartment integrated into it, also known as a swing-basket, and also an upper lid opening upwards, to allow water to be fed to the tank.

In these known machines, in order to allow a correct positioning/removal of the filter in/from the filter-carrier compartment, a great lateral rotation of the swing basket is necessary, more than 90°, which entails a lateral increase in the bulk of the machine in the open condition. The opening filter-carrier can also interfere with possible objects or domestic appliances normally adjacent to the machine for the filtered coffee.

Moreover, the upper lid which opens upwards has the same disadvantages already illustrated for the known machines which load the coffee and water from above.

These problems are all the more serious because in modern societies the need has arisen to make living spaces compact and optimize them in most dwellings, particularly in domestic kitchens, providing the use of domestic appliances that are built-in and/or disposed in series on the work surfaces.

However, known machines for filtered coffee, which for use require daily reloading operations and hence access to the compartments for the coffee and the water, do not allow to exploit the available space to the utmost, and can even limit the presence of other domestic appliances.

A purpose of the present invention is therefore to achieve a machine for filtered coffee which is simple and economic to produce and which does not need, in order to be reloaded and/or prepared, additional maneuvering spaces, laterally and upwards, beyond the volumetric bulk of the machine itself.

The Applicant has devised, tested and embodied the present invention to overcome the shortcomings of the state of the art and to obtain these and other purposes and advantages.

SUMMARY OF THE INVENTION

The present invention is set forth and characterized in the main claim, while the dependent claims describe other characteristics of the invention or variants to the main inventive idea.

In accordance with the above purpose, a machine for preparing filtered coffee, or American coffee, according to the present invention comprises a main body provided with at least:

i) a tank to contain the water;
ii) a front wall having a compartment to house the container of the filtered coffee; and
iii) a basket, or a loading door, having at least a compartment to house means to filter the coffee.

The basket is pivoted laterally to the front wall, so as to be disposed between a first closed position comprised within the bulk of the front wall, and a second open position, protruding outside the front wall, in which it allows access to the filter-carrier so that it can be loaded and/or removed.

According to a characteristic feature of the present invention, the front wall comprises at least an aperture for frontal access to the tank containing the water. The aperture is selectively closed by the loading door when it is in its first closed position.

In this way, with the loading door in the second open position, it is possible to load not only the coffee into the relative filter-carrier, which thus becomes accessible, but also the water from a zone substantially in front of the main body, so that no additional maneuvering space is necessary, either laterally or upwards, with respect to the bulk of the machine in the closed condition.

In other words, the opening of the swing basket also makes it possible to access the water tank from the front, in order to carry out direct loading operations easily.

This advantage allows a convenient and functional disposition of the machine for filtered coffee according to the present invention also in built-in applications, or adjacent to other domestic appliances disposed in series on the same work surface; in this way it is possible to exploit the available space to the utmost, without limiting the presence of other domestic appliances, and without requiring inconvenient displacements of the machine every time it is reloaded.

Preferably, the housing compartment for the filter-carrier is made on the loading door, so that it is positioned completely outside the bulk of the main body when the loading door is in a condition rotated by an angle of about 90° or less with respect to the front wall.

This advantageous solution further allows to effect all the operations of preparing and reloading the machine according to the invention from a zone substantially in front of the main body, and therefore without requiring any additional maneuvering space.

In one form of embodiment of the present invention, the loading door has an inner face that comprises a connection slide connected to the tank, which becomes accessible at the moment the loading door is opened. This further facilitates the operations of filling the water tank and also the filter-carrier from the front, every time the machine is reloaded.

Alternately, the aperture comprises a conveyor surface facing towards the outside of the front wall.

In another form of preferential embodiment, one of the hydraulic pipes conveying the water from the tank to the housing compartment of the filter-carrier is disposed in such a manner as to function as a pivoting element for the loading door with respect to the front wall.

BRIEF DESCRIPTION OF THE DRAWINGS

These and other characteristics of the present invention will become apparent from the following description of a preferential form of embodiment, given as a non-restrictive example with reference to the attached drawings wherein:

FIG. 2 is a three-dimensional view of the machine for filtered coffee in FIG. 1 in a first operating condition;

FIG. 3 is a three-dimensional view of the machine for filtered coffee in FIG. 1 in a second operating condition;

FIG. 4 is a three-dimensional view of the machine for filtered coffee in FIG. 1 in a third operating condition;

FIG. 5 is a three-dimensional view of a variant of the machine for filtered coffee in FIG. 1 in a first operating condition;

FIG. 6 is a three-dimensional view of the machine for filtered coffee in FIG. 5 in a second operating condition;

FIG. 7 is a three-dimensional view of the machine for filtered coffee in FIG. 5 in a third operating condition.

DETAILED DESCRIPTION OF A PREFERENTIAL FORM OF EMBODIMENT

Figure 1:
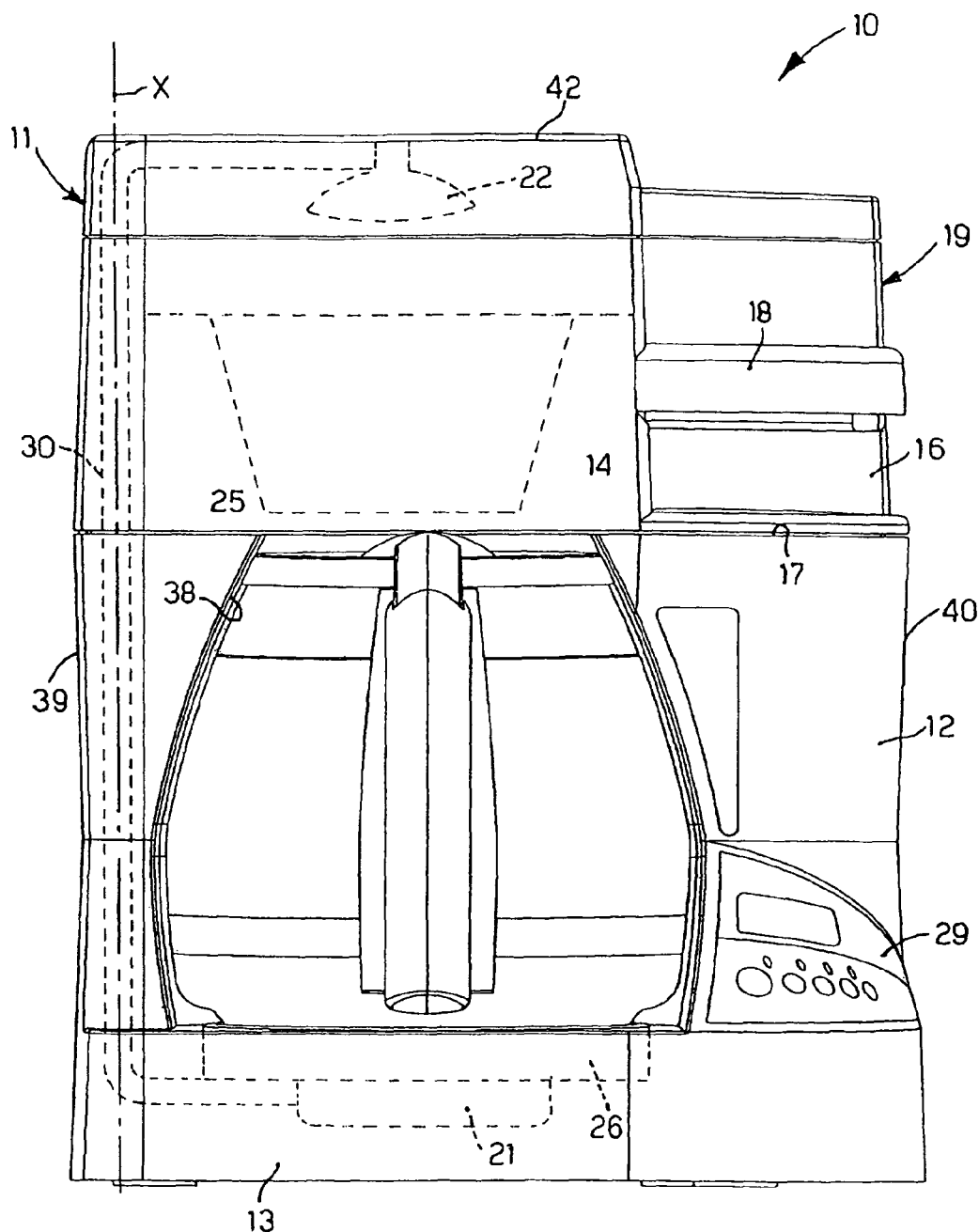
FIG. 1 is a front view of a first form of embodiment of a machine for filtered coffee according to the present invention.

With reference to the attached drawings, a machine 10 for preparing filtered or American coffee is shown in its entirety.

The machine 10 comprises a main body 11, substantially parallelepiped in shape, with an overall bulk defined by a base 13 resting on a plane, by a front plane or wall 12 facing during use towards the user, by two lateral planes or walls 39 and 40 laterally adjacent and on opposite sides of the front wall 12, by a bottom wall 41 which connects the two lateral walls 39 and 40 on the opposite side to the front wall 12, and by an upper wall 42 which connects at the upper part the two lateral walls 39 and 40, the bottom wall 41 and the front wall 12.

The main body 11 is equipped with at least a tank 20 to contain the water, at least an aperture 17 to access at least said containing tank 20, so as to load the water, and a basket 19, comprising a housing compartment 14 able to house means to filter the coffee, said basket 19 being pivoted to said main body 11 so as to be rotatably and selectively disposed between a closed position, in which said basket 19 is comprised within the bulk of said main body 11, so that access to said housing compartment 14 is prevented, and an open position, in which said basket 19 makes access available to said housing compartment 14, and vice versa.

Although in the shown embodiment it is disclosed that the tank 20 for the water, as seen by the front (see for example FIG. 4), is in the right side of the machine whereas the basket 19 for the coffee is in the left side, it is clear that the relative positions of the tank 20 and of the basket 19 could be exchanged without departing from the scope of the invention.

According to one feature of the present invention, said basket 19, in said closed position, closes said aperture 17, preventing access to said containing tank 20, and in said open position allows frontal access to said containing tank 20 through said aperture 17, in order to load the water into said containing tank 20.

Advantageously, the front wall 12, the base 13, the lateral walls 39 and 40, the bottom wall 41 and the upper wall 42 are made in a single piece, for example by molding a polymeric material, such as polypropylene, polycarbonate, ABS and suchlike, although it is not excluded that they may be made, also partly, of metal materials or other.

To be more exact, the two lateral walls 39 and 40 and the bottom wall 41 define, inside the main body 11, the containing tank 20 for the water, while the base 13 comprises, integrated inside it, a heating plate 26 which on the one hand allows to heat the water contained in the containing tank 20 in order to prepare the filtered coffee, and on the other hand allows to keep the filtered coffee at temperature, delivered and contained in a carafe 25.

The front wall 12 comprises a housing compartment 38 defined at the lower part by the base 13 and inside which the carafe 25 is positioned; it has the loading aperture 17 connected to the containing tank 20 and open frontally so as to allow the water to be loaded directly from the front wall 12 into the tank 20.

The basket 19 is advantageously pivoted flag-wise along a lateral edge of the front wall 12, which extends transversely along the whole width of the front wall 12.

The basket 19 substantially consists of an external front-piece 16, on which an opening handle 18 is made, and of an internal loading tray 23, on which the housing compartment 14 for the filter-carrier is made, open at the lower part towards the housing compartment 38 for delivering the percolated coffee, and in which a filter for powdered coffee is prepared, of a known type and not shown here, for example of the re-usable or throwaway type, conformed U-shaped or V-shaped, or other as desired.

The basket 19 is selectively rotatable around a pivoting axis X between a first closed position and a second open position.

In the embodiment shown in FIGS. 2 to 4, a connection slide 24 is also made on the loading tray 23, able to be connected fluidically with the containing tank 20, having a terminal part facing, when the basket 19 is in the second open position, inside the loading aperture 17, so as to make the water poured by the user flow from a frontal zone of the main body 11, inside the loading aperture 17.

According to the variant shown in FIGS. 5 to 7, the loading tray 23 does not provide any connection slide 24, but the loading aperture 17 itself comprises a conveyor surface 27, conformed as a beak and facing towards the outside of the front wall 12, so as to facilitate for the user the operations of front filling of the containing tank 20.

In the first closed position, the basket 19 is substantially comprised within the bulk of the front wall 12, so that its loading tray 23 is completely inside the main body 11, while the closing front-piece 16 goes to completely stop up the loading aperture 17, preventing access to the housing compartment 14 and to the containing tank 20.

In the second open position, the basket 19 protrudes outside the front wall 12, so that the filter-carrier compartment 14 provided on the loading tray 23 is completely outside the main body 11, allowing an easy frontal preparation of the filter for the powdered coffee, while the connection slide 24 has its terminal part in cooperation with the loading aperture 17, which, in this second position, is free of the closing front-piece 16 and hence accessible from a zone in front of the main body 11, in order to load the water into the containing tank 20.

In the case of the constructional solution shown in FIGS. 5 to 7, it is obvious that, since there is no connection slide 24, the positioning of the basket 19 in its second open position determines only the release of the closing front-piece 16 from the loading aperture 17, for access to the containing tank 20.

The filter-carrier compartment 14 is made on the loading tray 23 so as to be completely outside the bulk of the main body 11, before the closing front-piece 16 is inclined by an angle of more than about 90° with respect to the front wall 12.

In this way, the operations to prepare the filter in the filter-carrier compartment 14 can be carried out easily from the front, without requiring any maneuvering space laterally outside the main body 11.

The main body 11 also comprises inside a plurality of hydraulic pipes 21 which allow to convey the water contained in the containing tank 20 until it contacts the heating plate 26, and from here to channel it due to capillarity to a shower-type deliverer 22 connected to the inner surface of the upper wall 42 in correspondence with the filter-carrier compartment 14, to nebulize the hot water onto the coffee contained in the filter and thus start the percolation of the coffee.

To be more exact, between the hydraulic pipes 21, a pivoting pipe 30 is provided, disposed substantially coaxial with the pivoting axis X of the basket 19 to the front wall 12, which connects the heating zone of the water near the heating plate 26 with the shower-type deliverer 22.

In this way, the pivoting pipe 30 constitutes not only the means for the heated water to rise, but also a means for pivoting said basket 19 to the front wall 12.

Advantageously, the front wall 12 also comprises a command and control unit 29 provided, in a substantially known manner, with a display and a plurality of command keys, by means of which it is possible to set and/or select manually, always acting from a substantially frontal zone, a plurality of functioning programs of the machine 10.

According to one feature of the present invention, the machine 10 allows complete frontal access to the filter-carrier compartment 14 and to the tank 20 containing the water; by frontal access we mean access that does not exceed the bulk in height of the machine 10 itself, that is, neither from below nor from above, irrespective of the substantive shape of the machine 10; in fact, the outer shape of the machine 10 can be, as desired and according to contingent market requirements, parallelepiped with a polygonal section, or it can have a varied irregular shape, curvilinear, concave/convex or other. In any case, the words "frontal" and "frontal access" are not limited to a front part of the machine 10, but are related to the main sense and direction, which do not exceed the bulk in height of the machine 10 itself.

It is clear, however, that modifications and/or additions of parts may be made to the machine 10 as described heretofore, without departing from the scope of the present invention.

It is also clear that, although the present invention has been described with reference to specific examples, a person of skill in the art shall certainly be able to achieve many other equivalent forms of machine for filtered coffee, having the characteristics as set forth in the claims and hence all coming within the field of protection defined thereby.

The invention claimed is:

1. A machine for filtered coffee comprising a main body having:
   at least a tank containing the water;
   at least an aperture to access at least said containing tank, in order to load the water;
   at least a basket, comprising a housing compartment able to house means to filter the coffee, said basket being pivoted to said main body so as to be rotatably and selectively disposed between a closed position, in which said basket is comprised in the bulk of said main body, in such a manner that access to said housing compartment is prevented, and an open position, in which said basket makes access available to said housing compartment and vice versa, wherein said basket, in said closed position, closes said aperture, preventing access to said containing tank, and in said open position allows frontal access to said containing tank through said aperture, in order to frontally load the water into said containing tank.

2. A machine as in claim 1, wherein said housing compartment is made in said basket in such a manner as to be positioned completely outside the bulk of said main body when said basket is in a condition rotated by an angle of not more than about 90° with respect to said main body.

3. A machine as in claim 1, wherein said basket has an inner face which comprises a connection slide fluidically connected with said containing tank, in order to facilitate the operation to fill from the front said containing tank for the water.

4. A machine as in claim 1, wherein said aperture comprises a conveyor surface facing towards the outside of said main body in order to facilitate the operation to fill from the front said containing tank.

5. A machine as in claim 1, wherein said main body also comprises a supporting base disposed below and provided with means to heat the water provided in said containing tank, the machine further comprising at least a hydraulic pipe able to convey said water heated by said heating means to delivery means provided above said housing compartment, and disposed in such a manner as to function as a pivoting element for said basket with respect to said main body.

6. A machine as in claim 1, wherein said main body also comprises a command and control unit able to allow to set and/or select a plurality of functioning configurations of said machine.

\* \* \* \* \*